No. 702,520. Patented June 17, 1902.
J. H. WINTEROWD.
DEVICE FOR BINDING HAY ON WAGONS.
(Application filed Feb. 18, 1902.)
(No Model.)
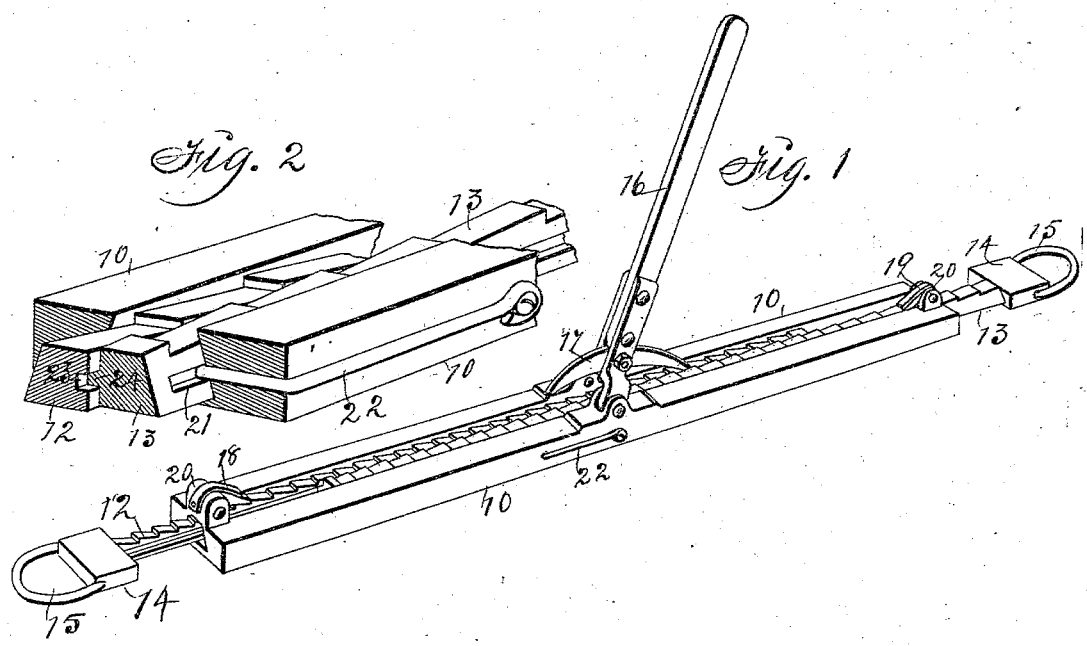
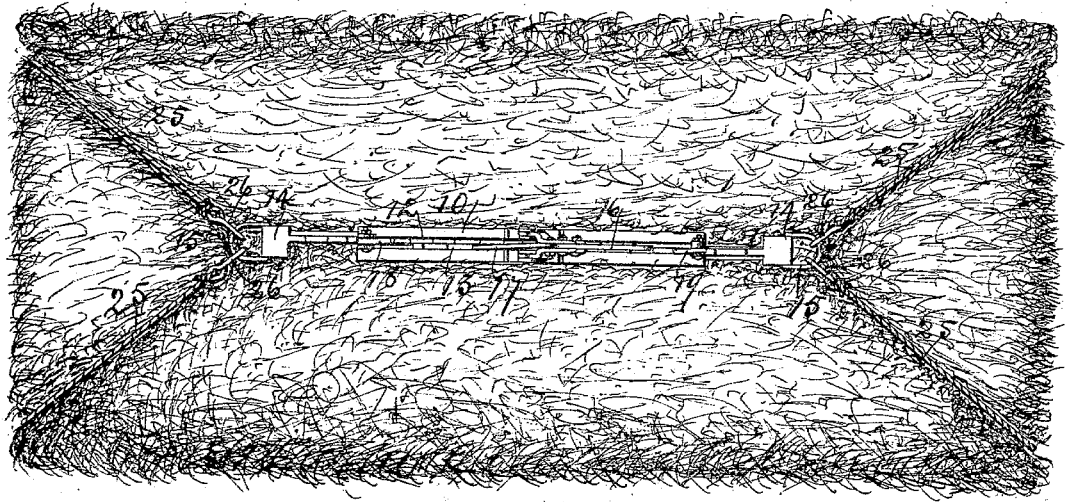
Witnesses:
R. C. Orwig.
R. H. Orwig.
Inventor: James H. Winterowd.
By Thomas G. Orwig, Attorney.

UNITED STATES PATENT OFFICE.

JAMES H. WINTEROWD, OF LEGRAND, IOWA.

DEVICE FOR BINDING HAY ON WAGONS.

SPECIFICATION forming part of Letters Patent No. 702,520, dated June 17, 1902.

Application filed February 18, 1902. Serial No. 94,625. (No model.)

*To all whom it may concern:*

Be it known that I, JAMES H. WINTEROWD, a citizen of the United States, residing at Legrand, in the county of Marshall and State of Iowa, have invented a new and useful Device for Binding Hay on Wagons, of which the following is a specification.

My object is to facilitate binding a load of hay securely and advantageously on a wagon as required for transportation and readily loosening the hay as required for removing the hay from the wagon.

My invention consists in the construction, arrangement, and combination of parts, as hereinafter set forth, pointed out in my claims, and illustrated in the accompanying drawings, in which—

Figure 1 is a perspective view of mechanism connected with a rigid frame adapted to be placed on top of a load of hay in lieu of a pole for stretching and fastening ropes connected with a hay-rack on a wagon. Fig. 2 is an enlarged detail view of a section of the rigid frame and operating devices connected therewith for stretching and fastening ropes. Fig. 3 is a top view of a load of hay, showing my invention in position on the hay as required for practical use.

The numeral 10 designates a straight rigid frame, preferably made of cast metal. It has a dovetail groove extended from end to end, and fitted in the groove are parallel racks 12 and 13, adapted to slide in reverse ways in the groove. The outer end of each rack has an enlargement 14, adapted to engage the end of the frame 10, and connected with the enlargement are rings or loops 15 for detachably connecting ropes therewith. To the center of the frame is fulcrumed a hand-lever 16, and in an opening in the lower end of the lever is pivoted a duplex pawl 17 in an inclined position, as shown in Fig. 3, in such a manner that one of the ends will engage the rack 12 and the other the rack 13, as required, to move the racks in reverse ways when the lever is vibrated.

Spring-actuated pawls 18 and 19 are mounted in bearings 20, formed on or fixed to the ends of the frame 10 in such a manner that the pawls will engage the sliding racks 12 and 13, as required, to lock the racks against outward motion when they are being drawn in by means of the lever for stretching ropes fixed to the loops 15.

To prevent the racks from being drawn outward too far and disconnected from the frame 10, grooves 21 are formed in the sides of each rack, as shown in Fig. 2, and elbow-shaped detents 22 are fixed to the outside of the frame and their free ends extended through perforations in the frame to terminate in the grooves and to engage the shoulders at the ends of the grooves. One of the racks is preferably provided with a longitudinal groove 23 and the other with a tongue 24, as shown in Fig. 2, for slidably connecting their inside faces.

Ropes 25, adapted to be fixed to the corners at the ends of a hay-rack on a wagon by tying or in any suitable way, are provided with hooks 26 on their free ends for detachably connecting the ropes with the loops 15 on the ends of the racks 12 and 13, as shown in Fig. 3, in such a manner that when the ropes are stretched they will compress the hay at the corners of the load of hay on a wagon and in combination with the rigid frame 10, extended on a central line of the load, securely bind the hay on the wagon. To stretch the ropes when in position on a load of hay, as shown in Fig. 3, the lever 16 can be readily manually operated, as required, to draw the racks 12 and 13 inward by successive motions, and the pawls 18 and 19 will retain them locked, as required, to prevent outward motions and the relaxing of the force thus applied for stretching the ropes and binding a load of hay on a wagon. To loosen the ropes and unbind the hay, it is only necessary to lift one of the pawls at the end of the frame to disengage it from one of the racks and then detach the ropes from the loops at the ends of the racks.

Having thus described the purpose, construction, application, and operation of my invention, its practical operation and utility will be readily understood by farmers and others familiar with the art to which it pertains, and what I claim as new, and desire to secure by Letters Patent, is—

1. In a device for binding hay on a wagon, a straight frame having a longitudinal groove in its top extending from end to end, two straight racks fitted in the groove to slide in reverse ways, means for fastening ropes to the ends of the racks, a lever fulcrumed to the central portion of the frame, a duplex pawl pivoted in a recess at the lower end of the lever to alternately engage the slidable racks, arranged and combined to operate in the manner set forth for the purposes stated.

2. In a device for binding hay in a wagon, a straight frame having a longitudinal groove in its top extending from end to end, two straight racks fitted in the groove to slide in reverse ways, means for fastening ropes to the ends of the racks, a lever fulcrumed to the central portion of the frame, a duplex pawl pivoted in a recess at the lower end of the lever to alternately engage the slidable racks, pawls mounted at the ends of the frame to engage the racks, grooves in the outside faces of the racks and devices fixed to the frame to enter the grooves, arranged and combined to operate in the manner set forth for the purposes stated.

3. In a device for binding hay on a wagon, a straight frame having a longitudinal groove in its top extending from end to end, two straight racks fitted in the groove to slide in reverse ways, means for fastening ropes to the ends of the racks, a lever fulcrumed to the central portion of the frame, a duplex pawl pivoted in a recess at the lower end of the lever to alternately engage the slidable racks, pawls mounted at the ends of the frame to engage the racks, grooves in the outside faces of the racks, devices fixed to the frame to enter the grooves, and ropes connected with the ends of the racks arranged and combined to operate in the manner set forth for the purposes stated.

JAMES H. WINTEROWD.

Witnesses:
 GEO. R. ARNOLD,
 O. P. HAYES.